United States Patent [19]

Himeno et al.

[11] 4,396,958
[45] Aug. 2, 1983

[54] TAPE RECORDER WITH AUTO-REVERSE SYSTEM

[75] Inventors: Yoshiharu Himeno; Masaki Kubota, both of Yokohama, Japan

[73] Assignee: Nissan Motor Company, Limited, Kanagawa, Japan

[21] Appl. No.: 186,292

[22] Filed: Sep. 11, 1980

[30] Foreign Application Priority Data

Sep. 19, 1979 [JP] Japan ............................ 54-123672[U]
Sep. 19, 1979 [JP] Japan ............................ 54-128673[U]

[51] Int. Cl.³ .............................................. G11B 15/44
[52] U.S. Cl. ..................................... 360/74.1; 360/90
[58] Field of Search ................... 360/74.1, 74.4, 74.5, 360/74.6, 74.7, 71, 90, 93, 96.1–96.4, 69, 73, 62

[56] References Cited

U.S. PATENT DOCUMENTS

| | | | |
|---|---|---|---|
| 3,461,249 | 8/1969 | Kamoji et al. | 360/74.4 |
| 3,573,393 | 4/1971 | Blackie et al. | 360/74.4 |
| 4,224,646 | 9/1980 | Schatteman | 360/74.2 |
| 4,270,152 | 5/1981 | Ida | 360/74.1 |
| 4,309,727 | 1/1982 | Osanai | 360/74.1 |
| 4,326,225 | 4/1982 | Osanai | 360/74.1 |

FOREIGN PATENT DOCUMENTS 2946344 5/1980 Fed. Rep. of Germany .
2020471 11/1979 United Kingdom ............... 360/74.2

*Primary Examiner*—Alfred H. Eddleman
*Attorney, Agent, or Firm*—Lowe, King, Price & Becker

[57] ABSTRACT

A tape recorder includes an auto-reverse system comprising an actuator incorporated with a tape driving means for switching driving direction from forward to reverse direction or from reverse to forward direction and a circuit for switching the actuator between operative and inoperative conditions. The switching circuit cooperates with a manual reversing switch and a tape end detecting means, used for auto-reverse operation. The switching circuit includes a manually operative switching means for selectively switching the auto-reverse system between operative and inoperative.

13 Claims, 2 Drawing Figures

TAPE RECORDER WITH AUTO-REVERSE SYSTEM

BACKGROUND OF THE INVENTION

The present invention relates generally to a tape recorder with an auto-reverse system which can automatically switch tape driving between forward and reverse direction in response to detecting of tape end. More particularly, the present invention relates to a manually operative switching means for selecting operative and inoperative positions of an auto-reverse system of a tape recorder.

Recently, there have been provided and used tape recorders which include auto-reverse systems for automatically switching directions of tape driving between forward and reverse directions. The auto-reverse system generally comprises a tape end detector sensitive to a tape end, for example, by sensing an electrically conductive part provided at the tape end and an actuator for operating a driving system of the tape recorder; the actuator switches driving directions of the tape between forward and reverse directions.

In such a conventional tape recorder, the auto-reverse system is operative in both a reproduce or play mode for reproduction of recorded sound and a record mode. This is convenient for continuously reproducing or recording in a forward track and a reverse track formed on the tape. However, in such system, if it is desired to play only one side of a track, i.e. either the forward track or reverse track, it is impossible to automatically stop the tape recorder at the tape end. Therefore, even if only one side of a track is played, the other side is necessarily and undesirably played unless there is a manual stop operation. Particularly, if the tape recorder has a system that a mode selector inhibits record operation during tape reverse drive and when the tape recorder is operated in the record mode during forward driving, the mode is automatically switched to reproduce mode in response to the tape driving direction switching from forward to reverse.

On the other hand, there is also available such a tape recorder that is provided with a so-called auto-stop system to automatically stop driving of the tape when the tape end is detected. Because of the inconvenience in the conventional tape recorder having an auto-reverse system, it is desirable to provide the auto-stop system in such a relationship with an auto-reverse system and an auto-stop system that can be manually selected to operate according to the tape recorder desired operating mode.

There is also a tape recorder which is provided with a pause mode function to temporarily stop tape driving. In the conventional tape recorder, the pause mechanism is provided independently of the manual reverse mechanism. While this tape recorder is in a pause mode, the manual reverse mechanism is still operative so that, if the operator unconsciously or erroneously touches or depresses the reverse switch, the reverse mechanism, unexpectedly operates to reverse the tape driving direction. Additionally, since the manual reverse switch is generally operative in response to a relatively small depressing force, the switch possibly becomes operative to switch the tape driving direction by unconsciously or carelessly touching it. Therefore, in such tape recorder, it is required to incorporate the manual reverse mechanism with the pause mechanism so as to prevent the above-mentioned miss-operation.

SUMMARY OF THE INVENTION

Therefore, it is an object of the present invention to provide a tape recorder auto-reverse system which can be selectively inhibited.

According to one embodiment of the present invention, the auto-reverse system cooperates with a means for operating the tape recorder in both the record and reproduce modes. A switching means inhibits operation of the auto-reverse system to provide the auto-stop function to the tape recorder. Therefore, in this embodiment, the tape recorder can be operated with an auto-reverse or auto stop function corresponding to the desired operation.

According to another embodiment of the present invention, the auto-reverse system includes a pause system with an interlock means for inhibiting operation of the auto-reverse system during a pause condition.

The present invention will become more fully understood from detailed description given below and from accompanying drawings of the preferred embodiments of the present invention which, however, are not to be taken limitative the present invention but for elucidation and explanation only.

DESCRIPTION OF THE PREFERRED EMBODIMENT

Figure 1:
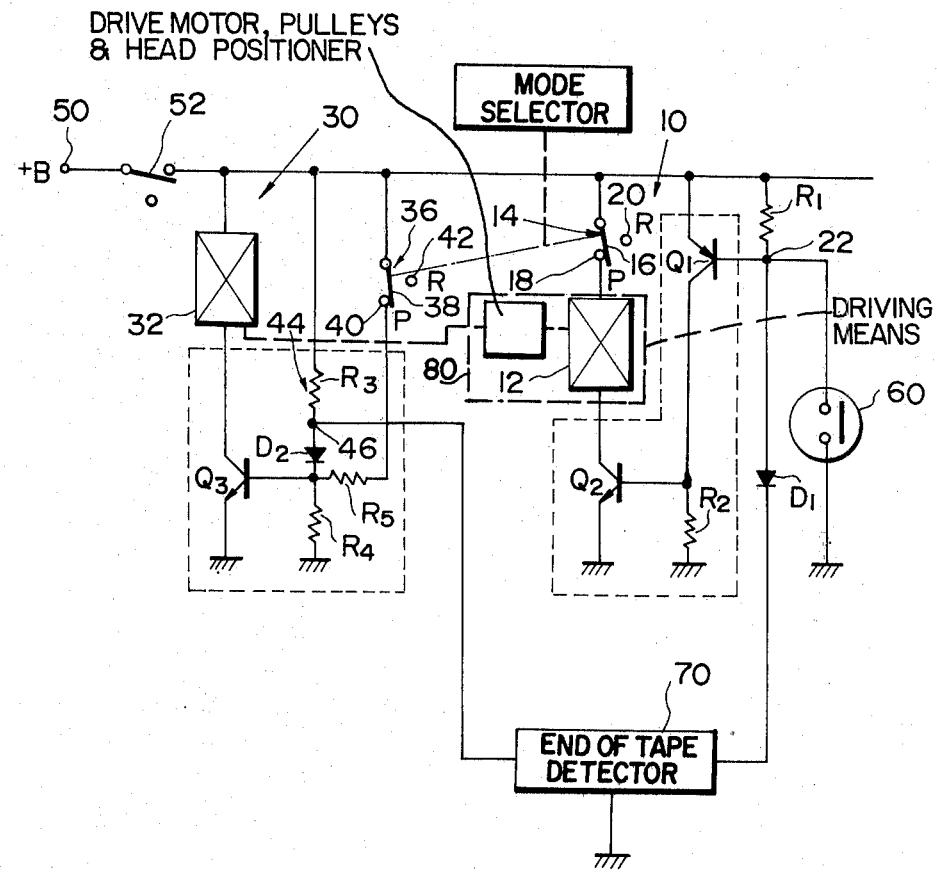
FIG. 1 is a schematic diagram of a preferred embodiment of an auto-reverse circuit of a tape recorder according to the present invention.

Referring now to the drawings, particularly to FIG. 1, there is illustrated a preferred embodiment of an auto-reverse circuit 10 which is incorporated with a holding circuit 30. A solenoid 12 is provided in the auto-reverse circuit 10 for switching the driving direction of a tape between forward play and reverse play. Solenoid 12 is incorporated in driving means 80 for reversibly driving the tape while the tape recorder operates to (1) record, (2)reproduce the sound, (3) drive the tape fast in the forward direction or (4)rewind the tape. The solenoid 12 is connected with an electric power source 50 through a power switch 52 and a manual selecting switch 14. The selecting switch 14 has a switch element 16 movable between contacts 18 and 20. The contact 18 corresponds to or cooperates with the record mode of the tape recorder operation and the contact 20 corresponds to or cooperates with the reproduce mode (play mode). It should be noted that, although each of contacts 18 and 20 corresponds to or cooperates with the record and reproduce mode selector switch in the shown embodiment, the contacts can be provided independently from such mode selector switches. A transistor $Q_1$ of p-n-p type is provided in the auto-reverse circuit 10 and is connected with the power source 50 by a series circuit including power switch 52. The collector electrode of the transistor $Q_1$ is connected to the base electrode of a n-p-n type transistor $Q_2$. The transistor $Q_2$ is interposed between the solenoid 12 and the ground. On the other hand, the base electrode of the transistor $Q_1$ is connected with a manually operative reversing switch 60 which is normally in a opened position.

The holding circuit 30 is connected substantially parallel with the auto-reverse circuit 10 with respect to the power source 50. A solenoid 32 is provided in the holding circuit 30 and is connected with the power source 50 through the power switch 52. The solenoid 32 urges the tape onto a magnetic head (not shown). The solenoid 32 is selectively connected to ground through the emitter collector path of a transistor $Q_3$ of n-p-n type. To the base electrode of the transistor $Q_3$, a selecting switch 36 is connected. The selecting switch 36 is ganged with the selecting switch 14 of the actuating circuit 10. The selector switch 36 has a switch element 38 movable between contacts 40 and 42 respectively corresponding to the record mode and reproduce mode. The base electrode of the transistor $Q_3$ is also connected with a detecting circuit 44 including a resistor $R_3$ and a diode $D_2$. Between the resistor $R_3$ and the diode $D_2$, the detecting circuit 44 is connected with a tape end detecting circuit 70. The tape end detecting circuit 70 is also connected with the base electrode of the transistor $Q_1$ and the manually operative reversing switch 60 through a diode $D_1$.

In the shown embodiment, when the switches 14 and 36 engage the contacts 18 and 40, whereby the tape recorder is in the reproduce i.e., play (p) mode, both the auto-reverse circuit 10 and the holding circuit 30 are supplied with operating voltage from terminal 50, assuming terminal 52 to be closed. In this switch position, applying power to the base electrode of the transistor $Q_3$, causes the electric potential thereon to reach a high level to turn on the transistor $Q_3$. The solenoid 32 becomes operative in response to turning on of the transistor $Q_3$. Solenoid 32 activates, within driving unit 80, a mechanism generally comprising an electric motor and pullys interconnected by a pully belt. If it is assumed that the tape is being driven in the forward direction, operation of the solenoid 32 causes tape driving means 80, e.g. a flywheel, a capstan, a reel driving shaft and so on, to be driven in a first direction in a known suitable manner so the tape continues in the forward direction. Also, activation of the solenoid 32 moves the reproducing magnetic head or record/reproduce magnetic head forwardly to contact the tape by a known suitable mechanism, such as by a combined lever operation. Therefore, the recorded audio sound can be reproduced during the play or reproduce mode of the tape recorder.

At this time, since the tape end detecting circuit 70 is inoperative and the output potential thereof is high, and the manually operative reverse switch 60 is turned off, the potential at terminal 22 is at a high level. The high potential is applied to the base electrode of the transistor $Q_1$ to cut off the same, whereby the transistor $Q_2$ is cut off so current does not flow through solenoid 12 and the solenoid is inactivated.

In response to the forward driven tape coming to the end of the tape, detecting circuit 70 detects an electrically conductive portion of the tape end, for example. Thereby, the tape end detecting circuit 70 becomes operative and derives a low level output potential. In response to the resulting reduction in the potential at terminal 22, the transistor $Q_1$ turns on, in turn turning on transistor $Q_2$. Thereby, the solenoid 12 becomes operative to switch the driving direction of tape from the forward to reverse direction. Activation of solenoid 12 changes the vertical position of the magnetic head to adapt the head magnetic core to the reverse track of the tape in a known suitable manner such as, for example, by operating a cam means.

At this time, in response to the lowered output potential of the tape end detecting circuit 70, the potential at terminal 46 drops to a low level. However, since the base electrode of the transistor $Q_3$ is connected with the power source 50 through the selector switch 36, the potential applied to the base of transistor $Q_3$ stops at a high level. Therefore, the transistor $Q_3$ is kept in one position to keep the solenoid 32 operative. Thus, the audio sound recorded on the reverse track can be automatically reproduced continuously with the sound recorded on the forward track.

On the other hand, if the mode selector is operated to the record mode so selector switches 14 and 36 are open circuited on contacts 20 and 42, while power switch 52 is closed to cause current to drop through the resistor $R_3$, the potential applied to the base electrode of the transistor $Q_3$ via terminal 46 is at a high level, to turn on the transistor $Q_3$. Therefore, as described for the operation of the tape recorder in the play mode, the tape is driven in the forward or reverse direction in the record mode in response to solenoid 32 becoming operative. At this time, since the selector switch 14 is open circuited, the solenoid 12 is not supplied with current and remains inoperative. Therefore, even when the tape end detecting circuit 70 detects the tape end, the auto-reverse circuit 10 is inoperative and thus the switching the operation for switching driving direction of the tape and changing of the track is not performed.

Consequently, when the tape end detecting circuit 70 becomes operative so the potential at the output thereof drops to a low level, the potential of the base electrode of the transistor $Q_3$ goes low to cut off the same. Thus, the solenoid 32 becomes inoperative to stop driving tape driving means 80 release the tape from the magnetic head, and thereby automatically stop operation of the tape recorder.

Figure 2:
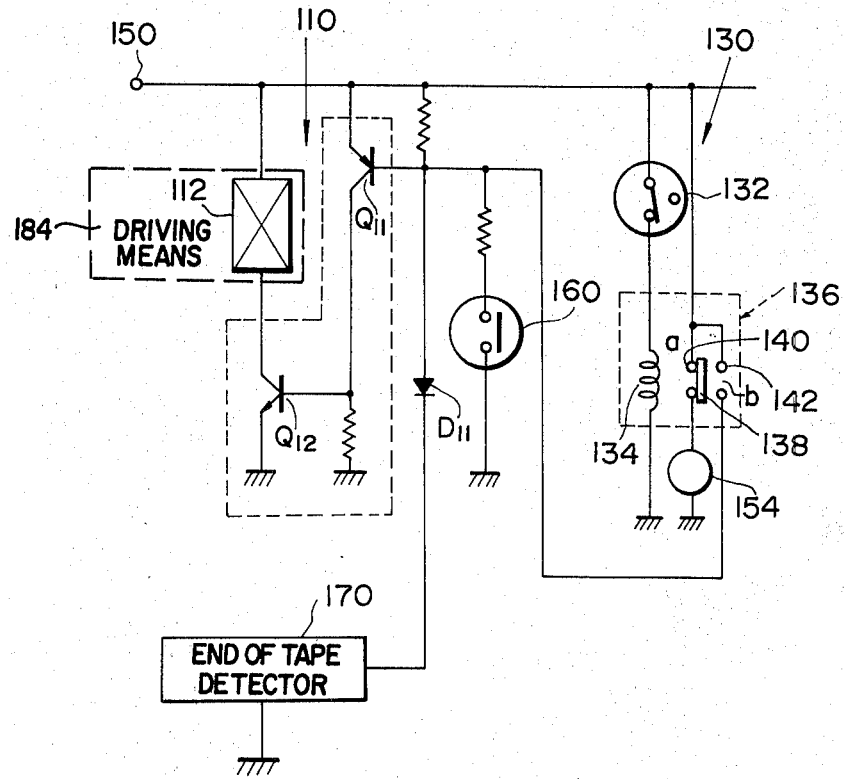
FIG. 2 is a schematic diagram of another embodiment of the auto-reverse circuit of the tape recorder according to the present invention.

Referring to FIG. 2, there is illustrated an auto-reverse circuit 110 incorporated with pause circuit 130 for temporary stopping of the tape drive. In this embodiment, the circuit structure of the auto-reverse circuit 110 is substantially the same as the circuit of FIG. 1, except that selector switch 14 of FIG. 1 is omitted in the FIG. 2 embodiment. The auto-reverse circuit 110 comprises a solenoid 112, a n-p-n type transistor $Q_{12}$ connected in series with the solenoid 112. The base electrode of the transistor $Q_{12}$ is connected to the collector electrode of the transistor $Q_{11}$. The base electrode of the transistor $Q_{11}$ is connected to a tape end detecting circuit 170 through a detecting diode $D_{11}$. Parallel to the tape end detecting circuit 170, a manually operative reverse switch 160 is also connected to the base electrode of the transistor $Q_{11}$.

A pause circuit 130 includes a pause switch 132. The pause switch 132 is in normally closed position and operates to temporarily stop the tape drive when it is turned off, i.e., open circuited. A relay coil 134 of a relay circuit 136 is connected in series with the pause switch 132. The relay circuit 136 further comprises a movable contact 138 being which engages contacts 140 and 142 in response to coil 134 being energized and deenergized, respectively. The terminal 140 is interposed between a power source 150 and a driving motor 154. The movable contact 138 is normally urged against the terminal 140 to complete power supply circuit for the driving motor. On the other hand, the terminal 142 is connected to the base electrode of the transistor $Q_{11}$.

In normal operating condition of the tape recorder, the pause switch 132 is kept in an on, i.e., closed, position to energize the relay coil 134 and thereby to urge the movable contact 138 toward the terminal 140. Thus, the driving motor 154 is driven in response to current being supplied thereto to drive the tape in one direction. At this time, the output potential of the tape end detecting circuit 170 is at a high level and therefore, the potential applied to the base electrode of the transistor $Q_{11}$ is at a high level. Thus, the transistor $Q_{11}$ is cut off. According to this, the transistor $Q_{12}$ is also cut off to prevent electric current from flowing therethrough. Therefore, the solenoid 112 for switching the driving direction of the tape is kept in an inoperative position.

On the other hand, the pause switch 132 is normally closed and thereby, the relay coil 136 is energized to urge the movable contact 138 toward the terminal 140 to complete the power supply circuit for the driving motor 154. Therefore, the tape is driven in the forward or reverse direction. At this time, the magnetic head is also moved toward the tape to record or reproduce the audio sound.

When the tape end detecting circuit 170 detects the end of the tape, potential of the output of the tape end detecting circuit 170 drops to the low level. The potential applied to the base electrode of the transistor $Q_{11}$ is at a low level to turn on the transistor $Q_{11}$. In response to transistor $Q_{11}$, turning on the potential applied to the base electrode of the transistor $Q_{12}$ goes to a high level, to turn on the same. Thus, current is supplied to the solenoid 112 to activate the same. In response to solenoid 112 becoming activated, the driving unit switches the tape driving direction from forward to reverse or from reverse to forward.

If the contacts of pause switch 132 are opened by manual operation, current flow to the relay coil 134 is cut and the coil is therefore deenergized. In response to de-energization of coil 34 the movable contact 138 engages the terminal 142. Thus, the power supply to the driving motor 154 is cut. The driving motor 154 is kept in a stopped position while the pause switch 132 is maintained in an off position. At this time, the current flowing through contact 138 of the relay circuit 136 is applied to the base electrode of the transistor $Q_{11}$ to keep the transistor cut off. Therefore even if the manual reverse switch 160 is depressed by miss-operation and turned on, the potential of the base electrode of the transistor $Q_{11}$ does not drop and is kept at a high level. By this, the solenoid 112 is prevented from erroneously operating to switch the tape driving direction and does not respond to operation of the manual reverse switch 160, while the tape recorder is maintained in pause condition.

According to this embodiment, since the pause circuit 130 and the auto-reverse 110 are incorporated so that the latter does not become effective when the former is temporarily stops the tape drive, the tape recorder can be satisfactorily and successfully prevented from erroneously reversing the tape driving direction by miss-operation of the manual reverse switch 160.

It should be noted that the means for incorporating the auto-reverse circuit 110 and the pause circuit 130 is not limited to the relay circuit 136 constructed as above. It can be embodied otherwise in any suitable construction. For example, the terminal 142 can be replaced by a normally closed terminal that it is opened in response to turning off of the pause switch to cut off (open circuiting) the circuit between the manual reverse switch 132 160 and the transistor $Q_{11}$. In addition, the structure and elements consisting the above-explained circuits of the embodiments of the present invention can be also embodied otherwise without departing from the principle of the invention.

What is claimed is:

1. In an auto-reverse tape recorder, an auto-reverse system comprising:
    a mode selector for selecting an operating mode for the tape recorder;
    a reversible driving means for driving a tape in forward and reverse directions;
    a tape end detector for deriving a reversing signal in response to the tape being driven to the end thereof in one direction;
    an actuator for said driving means responsive to said reversing signal for switching the driving direction of said driving means from a first direction to a second direction; and
    switch means connected with said actuator and responsive to said mode selector for disabling operation of the actuator while said mode selector is in a preselected operating mode for the tape recorder.

2. In an auto-reverse tape recorder, an auto-reverse system comprising:
    a mode selector for selecting an operating mode of said tape recorder, which operating mode includes a record mode and a play mode;
    a reversible driving means for selectively driving a tape in the forward and reverse directions;
    a detector for detecting the tape end as said tape is driven and for deriving a tape end signal when the tape end is detected;
    an actuator associated with said driving means for switching the driving direction of said driving means, said actuator being changed in condition between activated and deactivated conditions in response to said detector signal; and
    switch means connected with said actuator responsive to the selected mode selector condition being the record mode for disabling the changing function of said actuator to stop the auto-reverse function.

3. In an auto-reverse tape recorder, an auto-reverse system comprising:
    a mode selector for selecting an operating mode of the tape recorder between a record mode and play mode;
    a reversible driving means for driving said tape in forward and reverse directions;
    a detector for detecting the tape end as said tape is driven and for deriving a tape end signal when the tape end is detected;
    a head operating means for providing relative movement of a magnetic head with respect to a tape track when said mode selector is in said record or play mode, which head operating means is responsive to said tape end signal to move the head away from the tape;
    an actuator associated with said driving means for reversing the driving direction of the driving means in response to said detector signal, the condition of said actuator being changed between an activated position and a deactivated position in response to the tape end signal, the activated condition of the actuator corresponding to one of said forward and reverse drive directions of said driving means and the deactivated condition corresponding to the other driving direction of the driving means;

a holding means for latching said actuator in one of said activated and deactivated conditions for disabling the operation of the tape drive changing function of the actuator; and switch means associated with said holding means and said mode selector for operating said holding means to latch the changing function of the actuator when the mode selector is in said record mode.

4. A tape recorder as set forth in claim 1, 2 or 3 wherein said auto-reverse system is incorporated with pause system for temporarily stopping tape driving.

5. A tape recorder as set forth in claim 4 which further comprises a manually operative switch means, said manually operative switching means including a relay circuit co-operating with said pause switch of the pause system, said relay circuit having a switching element movable between first and second position, and, in said first position, said auto-reverse system being in an operative position and, in said second position, said auto-reverse system being inhibited to operate.

6. A tape recorder as set forth in claim 5, wherein in said second position of the switching element of said relay circuit, a manual lever switch is inhibited to effect for said auto-reverse system.

7. The tape recorder of claim 1 or 2 wherein said switch means includes first and second switches, said first switch being associated with said mode selector, said second switch being associated with said actuator and energized between a first condition in which said actuator is enabled to the changing function and a second condition in which said actuator is disabled from the changing function, said first switch being responsive to the mode selector condition being in a record mode to activate said second switch to said second condition.

8. The tape recorder of claim 3 wherein said switch means includes first and second switches, said first switch being associated with said mode selector, said second switch being associated with said holding means and energized between a first condition in which said holding means is inoperative to enable the actuator to perform the changing function and a condition in which said holding means is operative to disable the changing function of the actuator, said first switch being responsive to the mode selector condition being in a record mode to activate said second switch to said second condition.

9. A tape recorder and playback device with an automatically reversible tape drive mechanism, the device having means for controlling various operating modes, such as record and playback, and means for detecting when an end of a tape has been reached, said detecting means and operating mode means being coupled to the drive mechanism for controlling the drive mechanism to reverse the drive direction of the tape when the end of the tape has been reached while the device is in a first of the operating modes, the improvement comprising means responsive to the operating mode means indicating that the device is operating in another mode different from said first operating mode for inhibiting reversal of the tape drive direction while the end of the tape is detected by the detecting means.

10. A tape recorder and playback device comprising a reversible tape drive mechanism, means for activating the device to various operating modes, and means for detecting when an end of a tape has been reached, said detecting means and operating mode means being coupled to the drive mechanism for controlling the drive mechanism to reverse the drive direction of the tape when the end of the tape has been reached while the device is in a first of the operating modes and responsive to the operating mode means indicating that the device is operating in another mode different from said first operating mode for inhibiting reversal of the tape drive direction while the end of the tape is detected by the detecting means.

11. The device of claim 10 wherein the drive mechanism includes first and second solenoids selectively in first and second states, the first and second solenoids being respectively connected in first and second separate circuits, a power supply, the first solenoid while activated to the first state reversing the direction of the drive mechanism, the second solenoid while activated to the first state energizing the drive mechanism to drive the tape in a direction determined by the first solenoid and while in the second state disabling the drive mechanism, the first circuit including first and second switch means respectively responsive to the end of tape detector and the mode controlling means, the first and second switch means being connected to the power supply and the first solenoid so that in response to the end of tape being detected while the mode controlling means is in the first mode the first solenoid is in the first state thereof and in response to the end of tape being detected while the mode controlling means is in the second mode the second solenoid is in the second state thereof, the second circuit including third and fourth switch means respectively responsive to the end of tape detector and the mode controlling means, the third and fourth switch means being connected to the power supply and the second solenoid so that in response to the end of tape being detected while the mode controlling means is in the first mode the second solenoid is in the first state thereof and in response to the end of tape being detected while the mode controlling means is in a mode other than the first mode the second solenoid is in the second state thereof.

12. The device of claim 10 wherein the drive mechanism includes first and second activators selectively in first and second states, the first activator while activated to the first state reversing the direction of the drive mechanism, the second solenoid while activated to the first state energizing the drive mechanism to drive the tape in a direction determined by the first solenoid and while in the second state disabling the drive mechanism, means responsive to the end of tape being detected while the mode controlling means is in the first mode for causing the first actuator to be in the first state thereof and responsive to the end of tape being detected while the mode controlling means is in the second mode for causing the second actuator to be in the second state thereof, and means responsive to the end of tape being detected while the mode controlling means is in the first mode for causing the second actuator to be in the first state thereof and responsive to the end of tape being detected while the mode controlling means is in a mode other than the first mode for causing the second actuator to be in the second state thereof.

13. The device of claim 10, 11 or 12 wherein the first and second modes are respectively the playback and record modes.

* * * * *

UNITED STATES PATENT OFFICE
CERTIFICATE OF CORRECTION

Patent No. 4,396,958                    Dated August 2, 1983

Inventor(s) Yoshiharu Himeno; Masaki Kubota

It is certified that error appears in the above-identified patent and that said Letters Patent are hereby corrected as shown below:

Cover page, Item [30], the first priority application number should be changed from "54-123672" to --54-128672--.

Signed and Sealed this

Eleventh Day of October 1983

[SEAL]

Attest:

GERALD J. MOSSINGHOFF

Attesting Officer        Commissioner of Patents and Trademarks